United States Patent

Hisa

[11] Patent Number: 5,818,622
[45] Date of Patent: Oct. 6, 1998

[54] OPTICAL SCANNING APPARATUS

[75] Inventor: Fumiya Hisa, Kanagawa, Japan

[73] Assignee: Fuji Xerox Co., Ltd., Tokyo, Japan

[21] Appl. No.: 807,141

[22] Filed: Feb. 27, 1997

Related U.S. Application Data

[62] Division of Ser. No. 421,744, Apr. 13, 1995, Pat. No. 5,671,081.

[30] Foreign Application Priority Data

Jul. 15, 1994 [JP] Japan ................................. 6-185209

[51] Int. Cl.$^6$ .................................................. G02B 26/08
[52] U.S. Cl. .................................... 359/216; 359/198
[58] Field of Search ............................ 359/198, 200, 359/216–219; 347/256–261; 464/170

[56] References Cited

U.S. PATENT DOCUMENTS 4,796,963  1/1989  Yoshimura .......................... 359/218
5,671,081  9/1997  Hisa ................................... 359/216

*Primary Examiner*—James Phan
*Attorney, Agent, or Firm*—Finnegan, Henderson, Farabow, Garrett & Dunner, L.L.P.

[57] ABSTRACT

A damping member is disposed between a motor cover attached near a rotary polygon mirror drive motor so as to cover a rotary polygon mirror and an optical cover attached to an optical box so as to cover the motor cover and a (f-θ) optical lens group. The damping member can absorb a vibration generated in the motor cover when the rotary polygon mirror and the rotary polygon mirror drive motor are driven to thereby alleviate a transmission of a vibration to the optical cover. Furthermore, a heat generated from the rotary polygon mirror drive motor is radiated from the optical cover through the damping member to thereby prevent a heat from being filled in the inside of the optical cover. In this way, it is possible to avoid the vibration and the heat from affecting the (f-θ) lens group or the like as much as possible. Thus, the light beam can be focused on the photosensitive material under satisfactory condition.

6 Claims, 3 Drawing Sheets

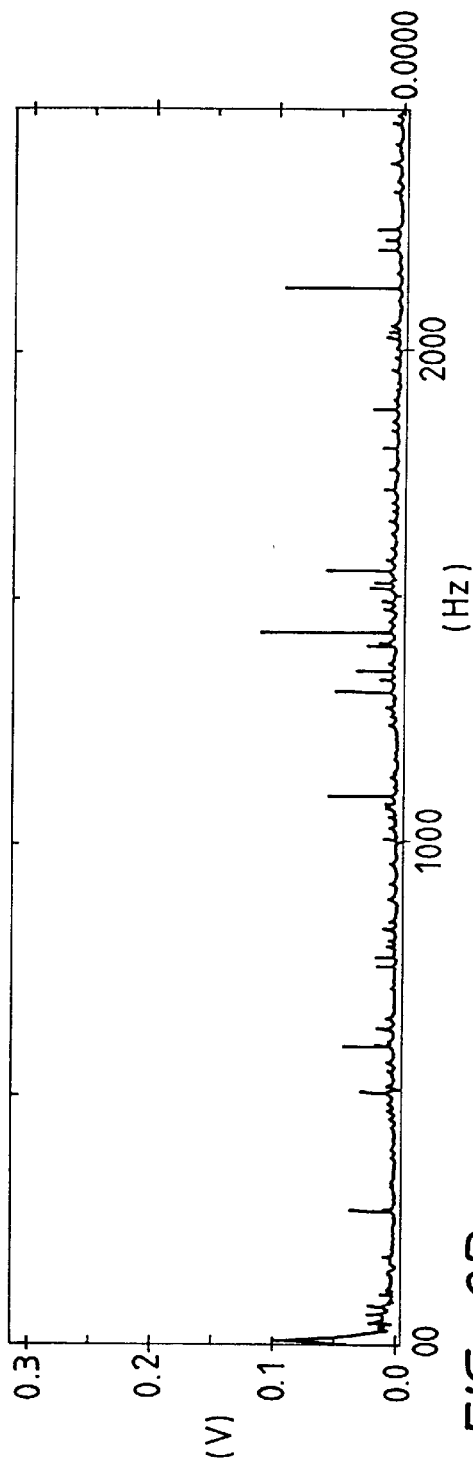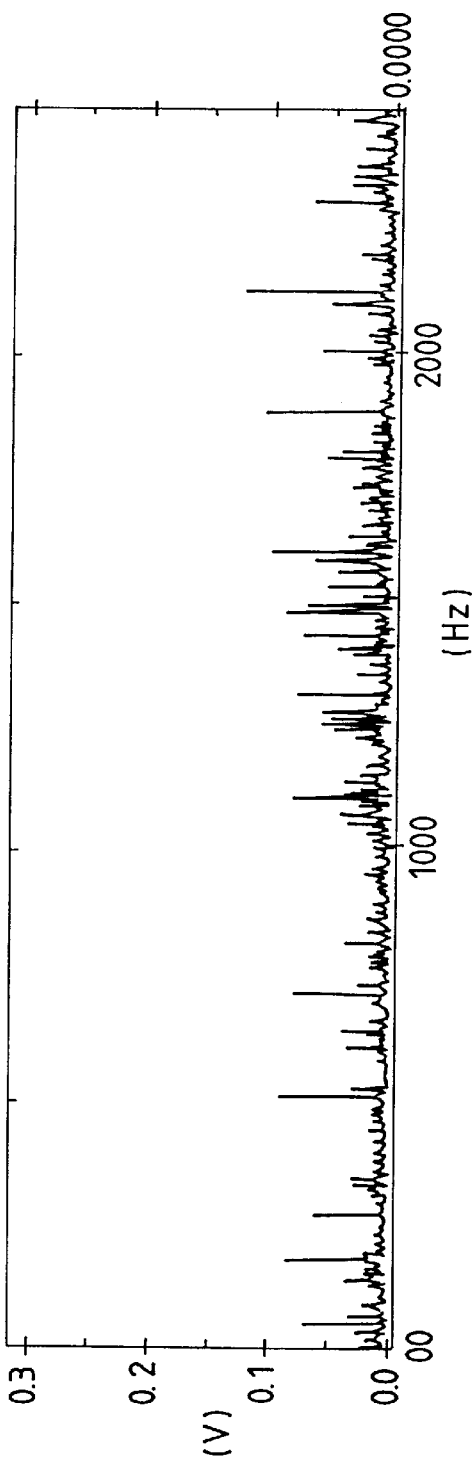

OPTICAL SCANNING APPARATUS

This is a division of application Ser. No. 08/421,744, filed Apr. 13, 1995, now U.S. Pat. No. 5,671,081.

BACKGROUND OF THE INVENTION

The present invention relates to an apparatus for damping and radiating a heat of a rotary polygon mirror drive motor and, more particularly, is directed to an apparatus for damping and radiating a heat of a rotary polygon mirror drive motor of an optical scanning apparatus used in a laser printer, a facsimile apparatus, a copying machine, a display or the like, for example.

In conventional optical scanning apparatus, it is a mainstream that a rotary polygon mirror is covered with a cover integrally formed with an optical box including optical units.

As a printing speed is increased and a printing density is increased recently, it is desired that a rotary polygon mirror drive motor can be operated at a high speed. There is then the problem that the rotary polygon mirror motor generates much heat and is vibrated considerably. On the other hand, rotary polygon mirror motors have to be designed so as to generate less heat from a circumstance problem standpoint.

To solve the aforesaid problems, as shown in a cross-sectional view of an optical scanning apparatus of FIG. 4, there is proposed a conventional art having a double-cover structure in which a motor cover is attached so as to cover a rotary polygon mirror 4 of a rotary polygon mirror drive motor 10 and an optical cover 5 is attached to an optical box 2 including optical units.

However, according to the conventional art, the motor cover 3 attached near the rotary polygon mirror motor 4 tends to vibrate. There is then the problem that a bad influence is exerted upon an image focused on a photosensitive drum 9 by optical scanning. Moreover, due to the double-closing structure, a heat generated from the rotary polygon mirror drive motor 10 is conducted to the motor cover 3 and radiated to the inside of the optical cover 5 and filled in the optical cover 5 to exert a bad influence upon (f-θ) optical lens group 6 or the like.

SUMMARY OF THE INVENTION

It is an object of the present invention to provide an apparatus for damping and radiating a heat of a rotary polygon mirror drive motor in which the above-mentioned problems encountered with the conventional art can be eliminated and in which vibrations can be alleviated and a heat radiating property can be improved.

To attain the above-mentioned object, according to a first aspect of the present invention, there is provided an apparatus for damping and radiating a heat of a rotary polygon mirror drive motor which includes a motor cover for covering the rotary polygon mirror drive motor and a rotary polygon mirror, an optical cover for an optical box for accommodating the motor cover and an condenser lens and so on and a damping member disposed between the upper surface of the motor cover and the lower surface of the optical cover.

According to a second aspect of the present invention, there is provided an apparatus for damping and radiating a heat of a rotary polygon mirror motor which includes a motor cover for covering the rotary polygon mirror drive motor and a rotary polygon mirror, an optical cover of an optical box having an opening portion into which the motor cover is projected upwardly and in which the condenser lens group are accommodated and a damping member disposed so as to fill a clearance between the motor cover and the opening portion of the optical cover and to tightly close a spacing formed by the optical box and the optical cover.

According to the first aspect of the present invention, by the damping member provided between the upper surface of the motor cover attached near the rotary polygon mirror drive motor so as to cover the rotary polygon mirror and the lower surface of the optical cover attached to the optical box so as to cover the motor cover and the condenser lens group, a vibration generated in the motor cover when the rotary polygon mirror and the rotary polygon mirror drive motor are driven can be absorbed and a transmission of vibration to the optical cover can be alleviated.

Moreover, a heat generated from the rotary polygon mirror drive motor provided within the motor cover can be radiated from the optical cover through the damping member. Thus, it becomes possible to prevent a heat from being filled in the optical cover.

According to the second aspect of the present invention, by the damping member provided so as to fill a clearance between the motor cove projected on the upper portion of the optical cover and the opening portion of the optical cover, a vibration generated when the rotary polygon mirror and the rotary polygon mirror drive motor are driven can be absorbed. Thus, it becomes possible to alleviate a transmission of a vibration to the optical cover.

Moreover, since the motor cover is projected from the opening portion of the optical cover, the motor cover is directly cooled by the air. Thus, it becomes possible to effectively radiate a heat generated from the rotary polygon mirror drive motor.

BRIEF DESCRIPTION OF THE DRAWINGS

FIGS. 2(a) and 2(b) are frequency distribution diagrams showing analyzed results of frequencies obtained after vibrations of the motor cover and the optical cover according to the first embodiment had been measured;

DETAILED DESCRIPTION OF THE PREFERRED EMBODIMENTS

An apparatus for damping and radiating a heat of a rotary polygon mirror drive motor according to an embodiment of the present invention will hereinafter be described in detail with reference to the drawings.

Figure 1:
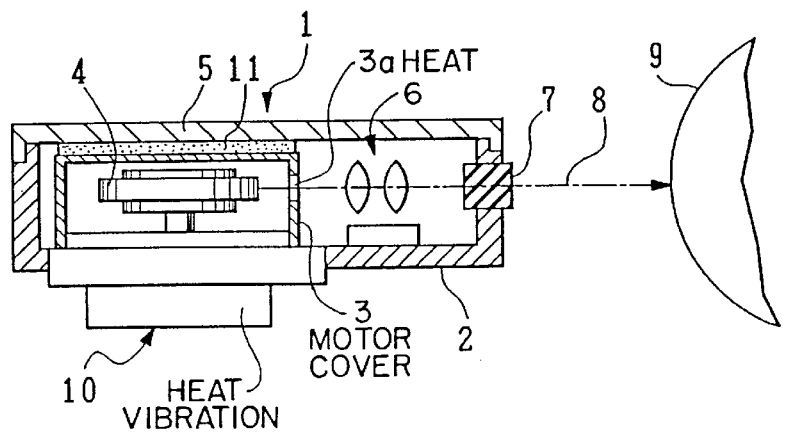
FIG. 1 is a cross-sectional view of an optical scanning apparatus used to explain a first embodiment according to the present invention.

FIG. 1 is a cross-sectional view of an optical scanning apparatus used to explain a first embodiment of the present invention. In FIG. 1, reference numeral 1 depicts an optical scanning apparatus, such as a laser printer, a facsimile apparatus, a copying machine or display. Reference numeral 2 depicts an optical box to which there are attached a (f-θ) optical lens group and a rotary polygon mirror drive motor 10. Reference numeral 3 depicts a motor cover having a transparent glass 3a and which is attached near the rotary polygon mirror drive motor 10 so as to cover the rotary polygon mirror 4. Reference numeral 5 depicts an optical cover attached to the optical box 2 so as to cover the motor cover 3 and the (f-θ) optical lens group 6. A space in which the motor cover 3 and the (f-θ) optical lens group 6 are disposed is hermetically sealed by the optical box 2 and the optical cover 5. Reference numeral 7 depicts a transparent glass held by the optical box 2 and the optical cover 5. Reference numeral 11 depicts a damping member disposed between the upper surface of the motor cover 3 and the lower surface of the optical cover 5 to prevent the motor cover 3 and the optical cover 5 from being vibrated as much as possible. The damping member 11 is adapted to directly join the motor cover 3 and the optical cover 5. Reference numeral 8 depicts a light beam which is reflected on the rotary polygon mirror 4 and radiated on a photosensitive drum 9 through the transparent glass 3a, the (f-θ) optical lens group 6 and the transparent glass 7. The optical box 2, the motor cover 3 and the optical cover 5 are made of a resin material, such as unsaturated polyester, alkyd resin and melanin resin or a metal material, such as aluminum. The above-mentioned damping member 11 is made of a rubber or a relatively hard sponge having small foams.

The damping and heat radiating member should preferably have a density of 0.24 to 0.32 g/cm$^2$, a compression residual strain of 3.4 to 7.9% and a thermal conductivity of 0.049 to 0.051 kcal/mhc°C. If the compression residual strain exceeds 7.9%, then the damping effect becomes weak with time. If a sponge is used as the damping and heat radiating member, then a sponge having a very high thermal conductivity of 0.049 to 0.051 kcal/mh°C. should preferably be used.

Figure 5A:
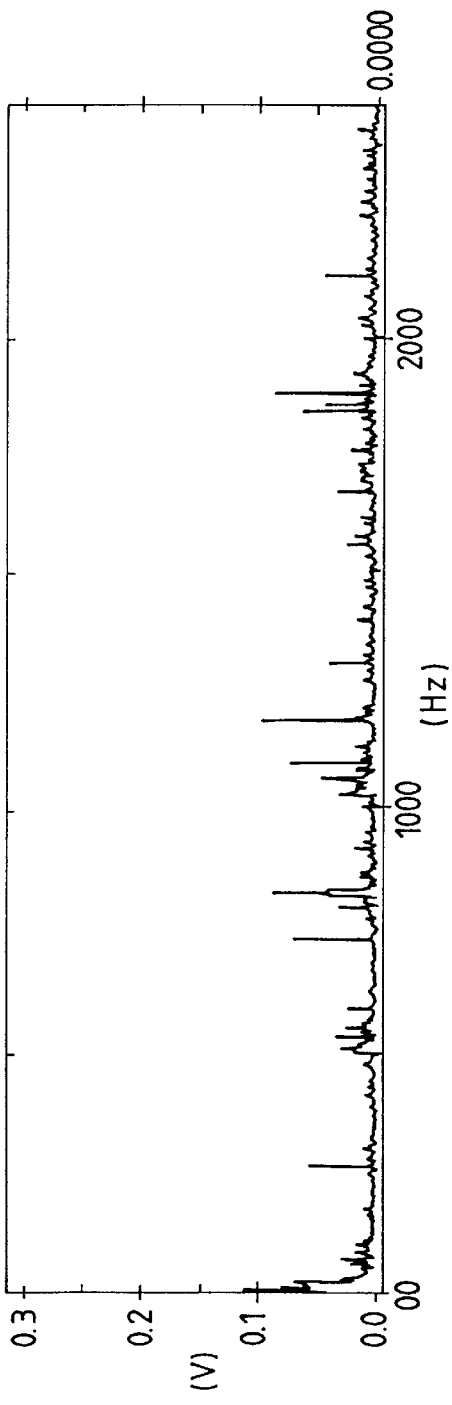
FIGS. 5(a) and 5(b) are frequency distribution diagrams showing analyzed results of frequencies obtained after vibrations of the motor cover and the optical cover according to the conventional art had been measured.
Figure 5B:
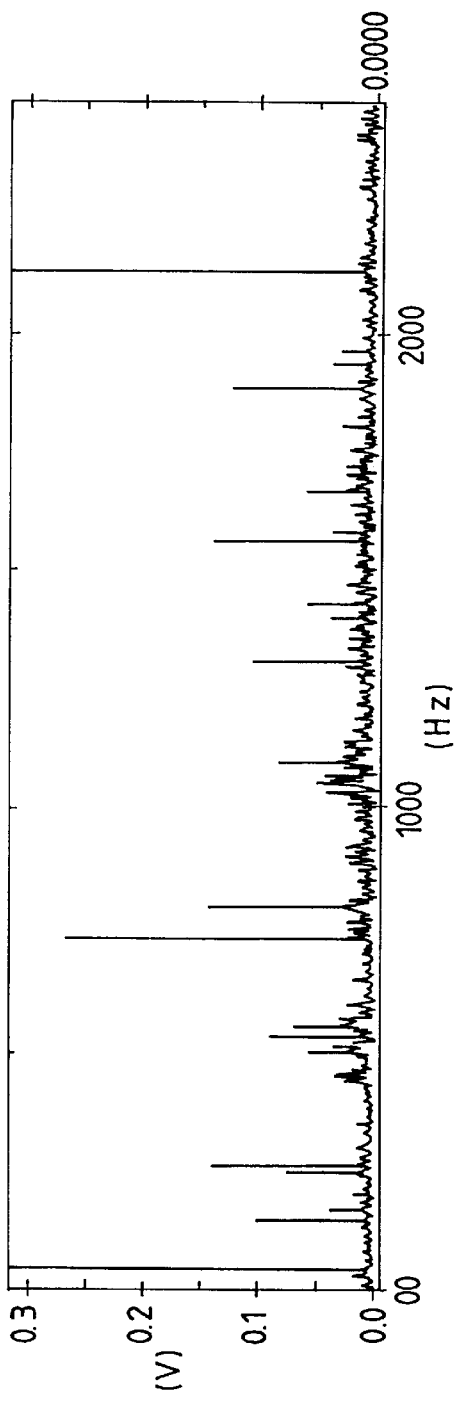

FIG. 2(a) is a graph used to explain Fourier-transformed results of measured results of a vibration of the optical cover 5 obtained when the damping member 11 is interposed between the motor cover 3 and the optical cover 5 according to this embodiment. FIG. 2(b) is a graph of Fourier-transformed results of measured results of a vibration of the motor cover 3 obtained when the damping member 11 is interposed between the motor cover 3 and the optical cover 5 according to this embodiment. FIGS. 5(a) and 5(b) are graphs used to explain Fourier-transformed results of measured results of a vibration of the optical cover 5 and the motor cover 3 obtained when the damping member 11 is not interposed between the motor cover 3 and the optical cover 5 according to the conventional art, respectively. In these graphs, a horizontal axis indicates a frequency (Hz) and a vertical axis represents a voltage (V).

As clear from FIGS. 2(a), (b) and FIGS. 5(a), (b), the above-mentioned damping member 11 absorbs a vibration generated in the motor cover 3 when the rotary polygon mirror 4 and the rotary polygon mirror drive motor 10 are driven to thereby alleviate a transmission of a vibration to the optical cover 5. In particular, it is to be understood that a magnitude of a vibration is considerably reduced in the low frequency region of 1000 Hz or lower.

Since the motor cover 3 and the optical cover 5 are directly joined with each other by the damping member 11, the optical scanning apparatus can escape a heat generated from the rotary polygon mirror drive motor 10 disposed within the motor cover 3 to the optical cover 5 through the damping member 11 and can radiate a heat so that a heat is not filled in the inside of the optical cover 5.

Figure 3:
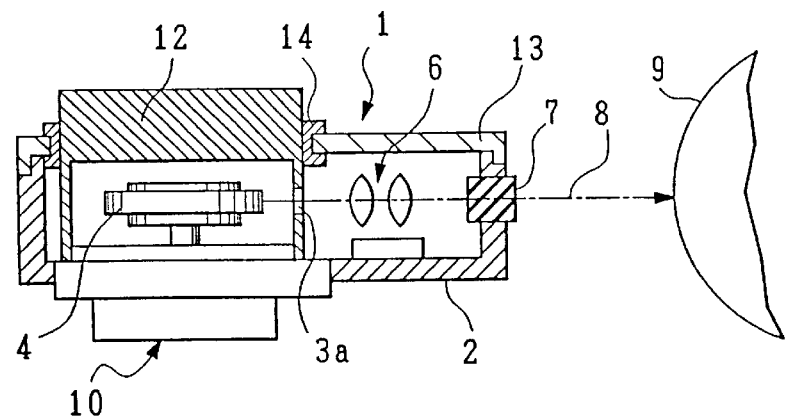
FIG. 3 is a cross-sectional view of an optical scanning apparatus used to explain a second embodiment according to the present invention.
Figure 4:
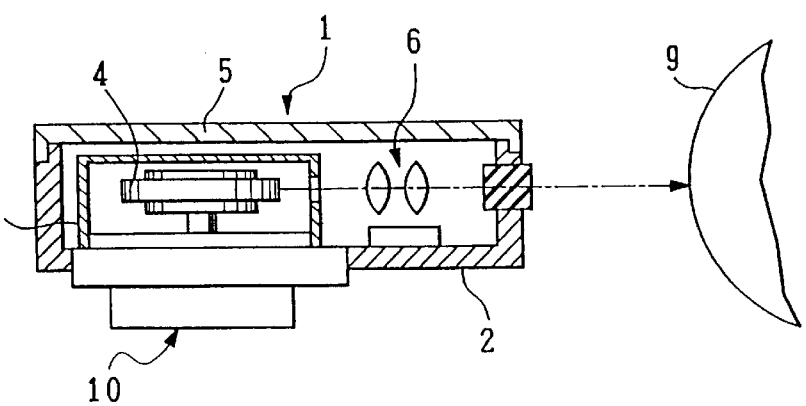
FIG. 4 is a cross-sectional view of an optical scanning apparatus according to the conventional art.

FIG. 3 is a cross-sectional view of an optical scanning apparatus used to explain a second embodiment according to the present invention. In FIG. 3, reference numeral 12 depicts a motor cover having the transparent glass 3a and which is attached to the rotary polygon mirror drive motor 10 so as to cover the rotary polygon mirror 4. Reference numeral 13 depicts an optical cover having an opening portion into which the motor cover 12 is projected upwardly and which is attached to the optical box 2 so as to cover the (f-θ) lens group 6. Reference numeral 14 depicts a damping member provided at the opening portion of the optical cover 13 in an annular fashion. The damping member 14 fills a clearance between the motor cover 12a and the opening portion of the optical cover 13 and tightly seals the space formed by the optical box 2 and the optical cover 13.

According to this embodiment, similarly to the first embodiment, the damping member 14 absorbs a vibration generated in the motor cover 12 when the rotary polygon mirror 4 and the rotary polygon mirror drive motor 10 are driven to thereby alleviate a transmission of a vibration to the optical cover 13. Therefore, it is possible to lower a noise caused by a vibration generated in the motor cover 12 and the optical cover 13.

Furthermore, since the motor cover 12 is projected from the opening portion of the optical cover 13, the motor cover 12 is directly cooled by the air and thereby a heat generated from the above-mentioned rotary polygon mirror drive motor 1 can be radiated effectively.

According to a first aspect of the present invention, by the damping member disposed between the motor cover and the optical cover, a vibration generated in the motor cover when the rotary polygon mirror and the rotary polygon mirror drive motor are driven can be absorbed and a transmission of a vibration to the optical cover can be alleviated, which can therefore reduce a noise caused by the vibration. Furthermore, a heat generated from the rotary polygon mirror drive motor disposed within the motor cover can be radiated from the optical cover through the damping member to thereby prevent a heat from being filled in the inside of the optical cover. Therefore, it is possible to avoid a vibration and a heat from affecting the condenser lens group or the like at minimum. Thus, a light beam can be focused on the photosensitive material under satisfactory condition.

According to a second aspect of the present invention, by the damping member disposed between the motor cover and the opening portion of the optical cover, a vibration generated in the motor cover when the rotary polygon mirror and the rotary polygon mirror drive motor are driven can be absorbed and a transmission of a vibration to the optical cover can be alleviated, which can therefore reduce a noise caused by the vibration. Furthermore, since the upper surface of the motor cover is projected from the opening portion of the optical cover, the motor cover can be directly cooled by the air. Therefore, it is possible to more effectively radiate the heat generated from the rotary polygon mirror drive motor as compared with the apparatus according to the first aspect of the present invention. Thus, it is possible to reduce the influence of the heat and the vibration exerted upon the condenser lens or the like. Therefore, the light beam can be focused on the photosensitive material under satisfactory condition.

What is claimed is:

1. An optical scanning apparatus wherein a beam emitted from a light source is reflected by a rotary polygon mirror attached to a rotary polygon mirror drive motor so as to be focused on a photosensitive material through a condenser lens, comprising:

an apparatus for damping and radiating heat of a rotary polygon mirror drive motor, including:

a motor cover for covering said rotary polygon mirror drive motor and said rotary polygon mirror;

an optical box having an optical cover having an opening portion into which an upper surface of said motor cover is projected upwardly and accommodating said condenser lens; and a damping member for filling a clearance between said motor cover and said opening portion of said optical cover and tightly closing a space formed by said optical box and said optical cover.

2. The optical scanning apparatus according to claim 1, wherein said damping member are made of a material selected from a group consisting of rubber and hard sponge having small foams.

3. The optical scanning apparatus of claim 1, wherein said optical box, said motor cover, and said optical cover are made of aluminum.

4. An optical scanning apparatus wherein a beam emitted from a light source is reflected by a rotary polygon mirror attached to a rotary polygon mirror drive motor so as to be focused on a photosensitive material through a condenser lens, comprising:

an apparatus for damping and radiating heat of a rotary polygon mirror drive motor, including:

a motor cover for covering said rotary polygon mirror drive motor and said rotary polygon mirror;

an optical box having an optical cover with an opening portion into which an upper surface of said motor cover is projected upwardly and accommodating said condenser lens; and a damping and heat radiating member for filling a clearance between said motor cover and said opening portion of said optical cover and tightly closing a space formed by said optical box and said optical cover.

5. The optical scanning apparatus according to claim 4, wherein a thermal conductivity of said damping and heat radiating member falls in a range of from 0.049 to 0.0051 kcal/mh°c.

6. The optical scanning apparatus according to claim 4, wherein said damping and heat radiating member has a compression residual strain of 3.4 to 7.9% and thermal conductivity of 0.049 to 0.051 kcal/mh°c.

* * * * *